United States Patent
Maruyama et al.

(10) Patent No.: US 11,767,488 B2
(45) Date of Patent: Sep. 26, 2023

(54) LUBRICANT COMPOSITION AND ROLLING BEARING HAVING SAME SEALED THEREIN

(71) Applicant: NSK LTD., Tokyo (JP)

(72) Inventors: Taisuke Maruyama, Fujisawa (JP); Yujiro Toda, Fujisawa (JP); Eri Watabe, Fujisawa (JP); Suguru Sugawara, Fujisawa (JP); Masayuki Maeda, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/637,129

(22) PCT Filed: Dec. 21, 2018

(86) PCT No.: PCT/JP2018/047393
§ 371 (c)(1),
(2) Date: Feb. 6, 2020

(87) PCT Pub. No.: WO2019/131561
PCT Pub. Date: Jul. 4, 2019

(65) Prior Publication Data
US 2020/0248096 A1 Aug. 6, 2020

(30) Foreign Application Priority Data
Dec. 25, 2017 (JP) .................................. 2017-247912

(51) Int. Cl.
*C10M 169/06* (2006.01)
*F16C 33/66* (2006.01)
(Continued)

(52) U.S. Cl.
CPC ....... *C10M 169/06* (2013.01); *F16C 33/6633* (2013.01); *C10M 2205/0285* (2013.01);
(Continued)

(58) Field of Classification Search
CPC .............. C10M 107/02; C10M 115/08; C10M 129/40; C10M 133/40; C10M 137/04;
(Continued)

(56) References Cited

U.S. PATENT DOCUMENTS 6,329,327 B1 * 12/2001 Tanaka ................. C10M 125/10
508/362
2006/0134139 A1 6/2006 Kurohashi et al.
(Continued)

FOREIGN PATENT DOCUMENTS

CN 104479832 A 4/2015
CN 104560273 A 4/2015
(Continued)

OTHER PUBLICATIONS

International Search Report (PCT/ISA/210) dated Mar. 12, 2019 issued by the International Searching Authority in International Application No. PCT/JP2018/047393.
(Continued)

*Primary Examiner* — James C Goloboy
(74) *Attorney, Agent, or Firm* — Sughrue Mion, PLLC

(57) ABSTRACT

The rolling bearing of the present invention is lubricated with a lubricant composition which contains a fatty acid metal salt, a metal dithiocarbamate, a phosphorous-type additive, and a basic additive, and which has a total acid value of 3.7 mgKOH/g or more. The rolling bearing makes it possible to further improve anti-fretting performance, and to reduce a decrease in fretting resistance even when used under the circumstance that fluorine-type grease penetrates into the bearing using urea-type grease.

18 Claims, 3 Drawing Sheets

(51) Int. Cl.
    *C10N 40/02*     (2006.01)
    *C10N 50/10*     (2006.01)

(52) U.S. Cl.
    CPC ............ *C10M 2207/126* (2013.01); *C10M 2215/1026* (2013.01); *C10M 2215/221* (2013.01); *C10M 2219/068* (2013.01); *C10M 2223/04* (2013.01); *C10M 2290/04* (2013.01); *C10M 2290/10* (2013.01); *C10N 2040/02* (2013.01); *C10N 2050/10* (2013.01)

(58) Field of Classification Search
    CPC ............ C10M 139/00; C10M 141/12; C10M 169/06; C10M 2205/0206; C10M 2207/126; C10M 2215/1026; C10M 2215/221; C10M 2219/068; C10M 2223/04; C10M 2290/04; C10M 2290/10; C10N 2040/02; C10N 2050/10; F16C 33/6633
    See application file for complete search history.

(56) References Cited

U.S. PATENT DOCUMENTS

| | | | |
|---|---|---|---|
| 2006/0154833 | A1 | 7/2006 | Katou et al. |
| 2011/0059875 | A1* | 3/2011 | Tanimura ............ C10M 169/06 508/108 |
| 2012/0135083 | A1 | 5/2012 | Kurohashi et al. |
| 2014/0017311 | A1 | 1/2014 | Kurohashi et al. |
| 2015/0232784 | A1 | 8/2015 | Aida et al. |
| 2017/0253826 | A1* | 9/2017 | Suetsugu ............ C10M 177/00 |
| 2018/0003233 | A1* | 1/2018 | Tsuna ............ C10M 169/06 |

FOREIGN PATENT DOCUMENTS

| | | | | |
|---|---|---|---|---|
| CN | 104769086 | A | 7/2015 | |
| CN | 105255568 | A | 1/2016 | |
| CN | 106032481 | A | 10/2016 | |
| CN | 106459803 | A | 2/2017 | |
| CN | 106590846 | A | 4/2017 | |
| JP | 2003-113845 | A | 4/2003 | |
| JP | 2003-327990 | A | 11/2003 | |
| JP | 2005-188726 | A | 7/2005 | |
| JP | 2005-194303 | A | 7/2005 | |
| JP | 2006-169386 | A | 6/2006 | |
| JP | 2007-23015 | A | 2/2007 | |
| JP | 2008-88386 | A | 4/2008 | |
| JP | 2013028749 | A * | 2/2013 | ......... C10M 169/00 |
| JP | 2017-19987 | A | 1/2017 | |

OTHER PUBLICATIONS

Written Opinion (PCT/ISA/237) dated Mar. 12, 2019 issued by the International Searching Authority in International Application No. PCT/JP2018/047393.

Communication dated Jul. 16, 2019 issued by the Japanese Patent Office in counterpart Japanese Application No. 2019-531834.

Communication dated Sep. 3, 2021 issued by the State Intellectual Property Office of the P.R.China in application No. 201880058772.7, English Translation.

Communication dated Jan. 26, 2021, from the European Patent Office in counterpart European Application No. 18893376.6.

Office Action dated Apr. 6, 2022, issued by the China National Intellectual Property Administration in counterpart Chinese Patent Application No. 201880058772.7.

* cited by examiner

LUBRICANT COMPOSITION AND ROLLING BEARING HAVING SAME SEALED THEREIN

TECHNICAL FIELD

The present invention relates to a lubricant composition containing a particular additive and a rolling bearing lubricated with the lubricant composition.

BACKGROUND ART

When a rolling bearing for supporting a support shaft, such as a bearing for an AC servo motor, a hub bearing, and a pivot bearing for a hard disk drive (HDD), performs a slight reciprocation, or when it undergoes a slight reciprocation, fretting occurs on a surface of rolling element or a raceway surface of the bearing, and various problems occur, such as an increase in bearing torque, and flaking starting from a damaged part.

For a countermeasure against fretting wear, for example, ceramic balls have been used for rolling elements as described in Patent Document 1. However, ceramic balls cost higher as compared with commonly used steel balls.

Thus, fretting resistance has been also enhanced by a lubricant composition used for lubrication. For example, Patent Document 2 describes a grease composition to which inorganic magnesium fine particles and magnesium stearate are added. In addition, Patent Document 3 describes a grease composition to which one or more kinds selected from the group consisting of aluminum salts, magnesium salts, zinc salts and calcium salts of fatty acids are added.

Similarly, for example, as described in Patent Document 4, urea-type grease to which a phosphorus-type additive is added is also widely used in order to enhance the fretting resistance.

RELATED ART

Patent Document

Patent Document 1: JP-A-2005-188726
Patent Document 2: JP-A-2007-023015
Patent Document 3: JP-A-2006-169386
Patent Document 4: JP-A-2008-88386

SUMMARY OF INVENTION

Problem that Invention is to Solve

Depending on the application, a bearing may be used under the circumstance that fluorine-type grease penetrates into a bearing using urea-type grease. Then, as described in Patent Document 4, phosphorus-type additive contained in urea-type grease for improving the fretting resistance reacts with sodium nitrite generally blended in fluorine-type grease to generate nitric acid, and the fretting resistance decreases.

There is a great demand for further improvement in the fretting resistance. An object of the present invention is to further improve the fretting resistance, and to prevent a decrease in the fretting resistance even when the bearing is used under the circumstance that fluorine-type grease is penetrated into the bearing using urea-type grease.

Means for Solving the Problems

In order to solve the above problems, the present inventors have found that excellent fretting resistance due to a fatty acid metal salt and metal dithiocarbamate can be further improved by increasing an acid value of the lubricant composition to a certain value or more by using a phosphorus-type additive, and a basic additive is effective as an additive that prevents the decrease in the acid value of the lubricant composition while neutralizing nitric acid generated when the phosphorus-type additive is mixed and used with fluorine-type grease. Accordingly, they have completed the present invention. That is, the present invention provides the following lubricant composition and rolling bearing.

(1) A lubricant composition comprising a fatty acid metal salt, metal dithiocarbamate, a phosphorus-type additive and a basic additive, wherein a total acid value is 3.7 mgKOH/g or more.
(2) The lubricant composition according to the above (1), wherein pH is 8.6 or more.
(3) A rolling bearing lubricated by the lubricant composition according to the above (1) or (2).

Effects of the Invention

The lubricant composition according to the present invention provides excellent fretting resistance due to the fatty acid metal salt and the metal dithiocarbamate, and the fretting resistance is designed to be further improved by further increasing the total acid value to a certain value or more by the phosphorus-type additive. In addition, the basic additive prevents the decrease in the acid value of the lubricant composition while neutralizing nitric acid generated when the phosphorus-type additive is mixed and used with fluorine-type grease. This allows for maintaining the effect of improving fretting resistance by the fatty acid metal salts and the metal dithiocarbamate, and further by the phosphorus-type additive. For that reason, the application of the lubricant composition to a rolling bearing eliminates the need for use of an expensive ceramic ball for rolling elements, and a long-life rolling bearing which is inexpensive and has excellent fretting resistance is obtained.

EMBODIMENTS FOR CARRYING OUT THE INVENTION

Figure 1:
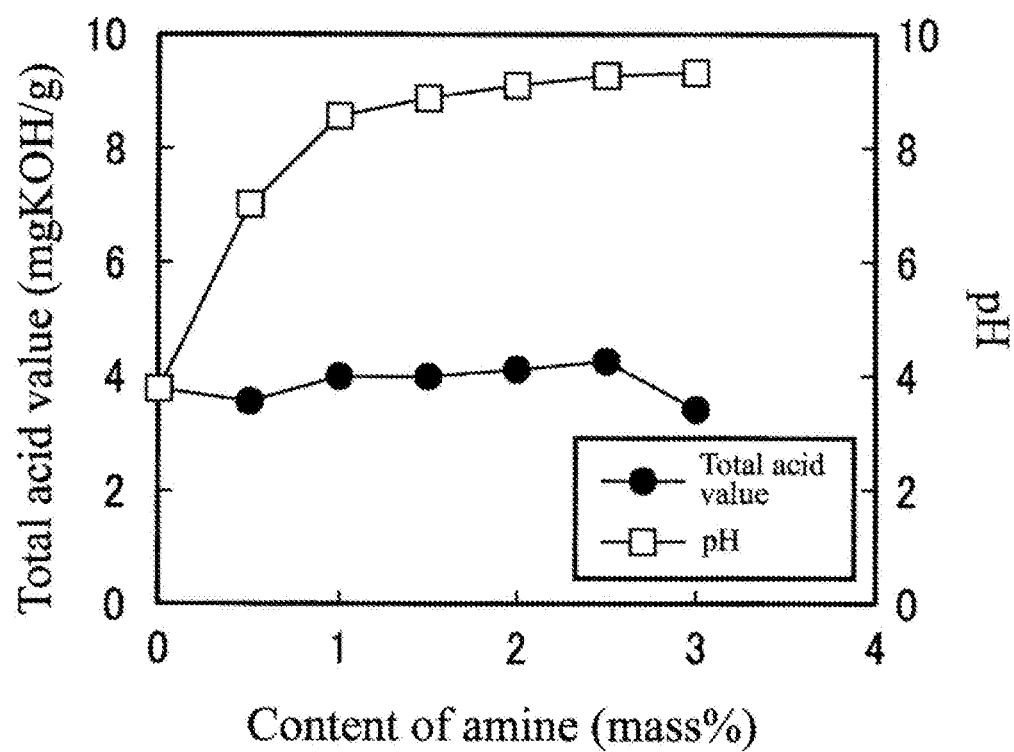
FIG. 1 It is a graph showing a relationship between a content of amine and a total acid value or pH obtained in Preliminary Test 1.

Hereinafter, the present invention will be described in detail.

[Lubricant Composition]

In the lubricant composition according to the present invention, containing a fatty acid metal salt and metal dithiocarbamate increases an acid value of the lubricant composition to a certain value or more by a phosphorus-type additive to improve fretting resistance. Further, a combined use of a basic additive phosphorus-type additive neutralizes nitric acid generated when fluorine-type grease is mixed with the phosphorus-type additive to prevent a decrease in the acid value of the lubricant composition.

A form of the lubricant composition is not limited and may be a lubricating oil composition obtained by adding four kinds of the additive to a lubricating oil, or may be a grease composition obtained by adding the four kinds of the additive to base grease containing a base oil and a thickener.

The lubricating oil and the base oil of the grease composition are not limited, and mineral oils or synthetic oils can be used therefor. Examples of mineral oils include paraffinic mineral oils and naphthenic mineral oils. In particular, those purified by appropriately combining vacuum distillation, oil deasphalting, solvent extraction, hydrocracking, solvent dewaxing, washing with sulfuric acid, purification with white clay, hydrorefining and the like are preferred. Examples of synthetic oils include hydrocarbon oils, aromatic oils, ester oils, and ether oils. Examples of hydrocarbon oils include poly α-olefin such as normal paraffin, isoparaffin, polybutene, polyisobutylene, 1-decene oligomer, and oligomers of 1-decene and ethylene, or hydrides thereof. Examples of aromatic oils include alkylbenzene such as monoalkylbenzene and dialkylbenzene, and alkylnaphthalene such as monoalkylnaphthalene and dialkylnaphthalene. Examples of ester oils include diester oils such as dibutyl sebacate, di-2-ethylhexyl sebacate, dioctyl adipate, diisodecyl adipate, ditridecyl adipate, ditridecyl glutarate, and methyl acetyl cinolate, aromatic ester oils such as trioctyl trimellitate, tridecyl trimellitate, and tetraoctyl pyromellitate, polyol ester oils such as trimethylolpropane caprylate, trimethylolpropane pelargonate, pentaerythritol-2-ethylhexanoate, pentaerythritol belargonate, and complex ester oils that are oligoesters of polyhydric alcohols and mixed fatty acids of dibasic and monobasic acids. Examples of ether oils include polyglycol such as polyethylene glycol, polypropylene glycol, polyethylene glycol monoether, and polypropylene glycol monoether, phenyl ether oils such as monoalkyltriphenyl ether, alkyl diphenyl ether, dialkyl diphenyl ether, pentaphenyl ether, tetraphenyl ether, monoalkyl tetraphenyl ether, and dialkyl tetraphenyl ether. These may be used alone, or two or more thereof may be mixed and used.

Among them, the synthetic oils are preferred, and poly α-olefin (PAO) and ester oils are more preferred. In addition, PAO is preferred for placing importance on wear resistance such as fretting resistance.

In addition, in consideration of fluidity at from a low temperature to a high temperature, a kinematic viscosity of the above oil is preferably 5 to 400 mm$^2$/s and more preferably 10 to 100 mm$^2$/s at a temperature of 40° C. When two or more kinds of oils are mixed and used, the kinematic viscosity is adjusted thereto.

For the grease composition, a urea compound or a metal soap is used as the thickener. Examples of the urea compound include an aliphatic urea compound, an alicyclic urea compound, and an aromatic urea compound, any of which is not limited and may be diurea, triurea, tetraurea and polyurea. Examples of the metal soap include metal soaps or composite metal soaps whose metallic species are Li, Na, Ba, Ca, and the like. In addition, the amount of thickener is not limited as long as the base oil can be kept in a gel form, and is preferably 5 to 50 mass % relative to the total amount of the base oil and the thickener. If the amount of the thickener is less than 5 mass %, the grease composition leaks, which is not preferred. If the amount of the thickener is more than 50 mass %, another problem is likely to occur, such as poor pumpability of the grease composition.

In addition, worked penetration of the grease composition is preferably 150 to 400. If the worked penetration is more than 400, the grease composition is scattered by centrifugal force to contaminate the outside, and if the worked penetration is less than 150, the pumpability of the grease composition becomes poor.

(Fatty Acid Metal Salt)

Preferred examples of fatty acid metal salts include metal salts that are formed of saturated or unsaturated fatty acids or hydroxy fatty acids having 4 to 18 carbon atoms and metal selected from the group consisting of aluminum, magnesium, silver, cadmium, copper, iron, nickel, barium, lithium, potassium, sodium, zinc, and calcium. Examples of fatty acids include linear saturated acids such as caproic acid, caprylic acid, capric acid, lauric acid, myristic acid, palmitic acid, stearic acid and 12-hydroxystearic acid, and branched saturated acids such as 4,6-dimethyloctanoic acid, 2-methylundecanoic acid, 2-methyltetradecanoic acid and 2-ethylpentadecanoic acid. Examples of unsaturated acids include 3-octenoic acid, 2-decenoic acid, caproleic acid, myristoleic acid, 2-methyl-2-dodecenoic acid, oleic acid, elaidic acid, linoleic acid, linolenic acid, and ricinoleic acid. These fatty acid metal salts may be used alone, or two or more thereof may be mixed and used. In particular, it is particularly preferred to mix and add four kinds of copper salts, iron salts, zinc salts, and magnesium salts of stearic acid.

A content of the fatty acid metal salts is preferably 0.001 to 15 mass %, and more preferably 0.001 to 10 mass % of the total amount of the lubricant composition. The content of less than 0.001 mass % cannot provide the effect of improving fretting resistance sufficiently.

The effect is only saturated with the content of more than 15 mass %.

(Metal Dithiocarbamate)

As a metal dithiocarbamate, for example, a compound represented by the following general formula (I) is preferred.

[Chem 1]

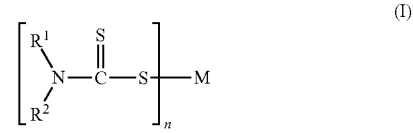

(I)

In the formula, M represents metal, and examples of M include aluminum, magnesium, copper, iron, nickel, barium, lithium, potassium, sodium, zinc, and molybdenum, in which zinc is particularly preferred. n is an integer corresponding to the valence of the metal. $R^1$ and $R^2$ represent a primary alkyl group, a secondary alkyl group, and an aryl group or an alkylaryl group, which have 2 to 18 carbon atoms, and $R^1$ and $R^2$ may be the same or different from each other. These metal dithiocarbamate may be used alone, or may be used by mixing a plurality thereof.

It is considered that when the lubricant composition is a grease composition, the metal dithiocarbamate has an effect of improving the fretting resistance by strengthening a thickener.

A content of the metal dithiocarbamate is preferably 0.001 to 15 mass %, and more preferably 0.001 to 10 mass % of the total amount of the lubricant composition. The content of less than 0.001 mass % cannot provide the effect of improving fretting resistance sufficiently. In addition, the effect is only saturated with the content of more than 15 mass %.

(Phosphorus-Type Additive)

The lubricant composition preferably has a total acid value higher than a certain value. Particularly, when it contains metal dithiocarbamate and has a total acid value of 3.7 mgKOH/g or more, the fatty acid metal salts are completely dissolved in the base oil of the lubricant composition.

When the total acid value of the lubricant composition is low, the fatty acid metal salts are dispersed in a powder (solid) state without dissolving in the base oil. Further, the powder functions as foreign matter in a contact area, which causes abrasive wear and fretting wear.

Therefore, a phosphorus-type additive is used to increase the total acid value of the lubricant composition. The small amount of the phosphorus-type additive causes the small increase in the total acid value of the lubricant composition to fail to sufficiently provide the effect of further improving the fretting resistance. The higher content of phosphorus-type additive allows for the higher total acid value of the lubricant composition. The content of 1 mass % or more provides a further effect of improving the fretting resistance, and particularly, the content of 2 mass % or more allows the total acid value to be 3.7 mgKOH/g or more at which the fatty acid metal salts are fully dissolved in the base oil. That is, the content of the phosphorus-type additive is 1 mass % or more, and preferably 2 mass % or more.

Considering stability, lubrication performance and the like when the phosphorus-type additive is added to the lubricant composition, the phosphorus-type additive is preferably phosphate esters and phosphite esters, and the following examples thereof may be used alone, or two or more thereof may be mixed and used.

Examples of phosphate esters include alkyl (C12, C14, C16, C18) acid phosphate, isotridecyl acid phosphate, oleic acid phosphate, tetracosyl acid phosphate, ethylene glycol acid phosphate, 2-hydroxymethyl methacrylate acid phosphate, dibutyl phosphate, bis(2-ethylhexyl) phosphate, diethyl benzyl phosphate, triphenylphosphine, monoethyl phosphate, mono n-butyl phosphate, mono n-octyl phosphate, mono n-lauryl phosphate and mono (2-hydroxyethyl methacrylate) phosphate, and particularly isotridecyl acid phosphate and mono n-butyl phosphate are preferred.

Examples of the phosphite esters include triphenyl phosphite, trisnonyl phenyl phosphite, tricresyl phosphite, triethyl phosphite, tris(2-ethylhexyl) phosphite, tridecyl phosphite, trilauryl phosphite, tris(tridecyl) phosphite, trioleyl phosphite, diphenyl mono(2-ethylhexyl) phosphite, diphenyl monodecyl phosphite, diphenyl mono(tridecyl) phosphite, trilauryl trithiophosphite, diethyl halogen phosphite, bis(2-ethylhexyl) hydrogen phosphite, dilauryl hydrogen phosphite, dioleyl hydrogen phosphite, diphenyl hydrogen phosphite, tetraphenyldipropylene glycol phosphite, a mixture of tetraphenyl (tetratridecyl) pentaerythritol tetraphosphite and bis(2-ethylhexyl) phthalate, tetra(C12-C15 alkyl)-4,4'-isopropylidene diphenyl phosphite, a mixture of bis(tridecyl) pentaerythritol diphosphite and bis(nonylphenyl) pentaerythritol diphosphite, bis(decyl) pentaerythritol diphosphite, bis(tridecyl) pentaerythritol diphosphite, tristearyl phosphite, distearyl pentaerythritol diphosphite, tris(2,4-di-tert-butylphenyl) phosphite, hydrogenated bisphenol A-pentaerythritol phosphite polymer and hydrogenated bisphenol A phosphite.

The total acid value of the lubricant composition can be measured, by a potentiometric titration method, based on JIS K 2501:2003 with a neutralization point pH being 12.

(Basic Additive)

As described above, adding the above three additives and preferably setting the total acid value to 3.7 mgKOH/g or more can greatly improve the fretting resistance. However, in some applications, fluorine-type grease is possibly to be mixed and used with the phosphorus-type additive, and this fails to provide the desired effect of improving fretting resistance even with adding the above three additives and setting the total acid value to 3.7 mgKOH/g or more.

Specifically, sodium nitrite, which is commonly blended in fluorinated grease, reacts with the phosphorus-type additive to generate nitric acid to decrease fretting resistance. Although it can be considered to add a neutralizing agent, this lowers the acid value to less than 3.7 mgKOH/g to decrease the fretting resistance. Therefore, a basic additive is used in combination in order to neutralize the generated nitric acid and not to reduce the total acid value.

Examples of the basic additive include metal sulfonate and amine. Specifically, examples of the metal sulfonate include calcium sulfonate, barium sulfonate, and sodium sulfonate. For amine, a hindered amine is preferred, and specifically, preferred examples thereof to be used include bis(2,2,6,6-tetramethyl-4-piperidyl) sebacate, bis(1,2,2,6,6-pentamethyl-4-piperidyl) sebacate, tetrakis(1,2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, bis(1-undecanoxy-2,2,6,6-tetramethylpiperidin-4-yl) carbonate, 1,2,2,6,6-pentamethyl-4-piperidyl methacrylate, 2,2,6,6-tetramethyl-4-piperidyl methacrylate, 2,2,6,6-tetramethyl-piperidin-4-yl-hexadecanate, 2,2,6,6-tetramethyl-piperidin-4-yl-octadecanate, methyl(1,2,2,6,6-pentamethyl-4-piperidyl) sebacate, N, N',N", N'''-tetrakis(4,6-bis(butyl-(N-methyl-2, 2,6,6-tetramethylpiperidin-4-yl)amono)triazine-2-yl)-4,7-diazadecane-1,10-diamine, poly(4-hydroxy-2,2,6,6-tetramethyl-1-piperidineethanol-alt-1,4-butanedioic acid), poly[[6-(1,1,3,3-tetramethylbutyl)amino]-s-triazine-2,4-diyl]-[(2,2, 6,6-tetrarmethyl-4-piperidyl)imino]-hexamethylene-[(2,2,6, 6-tetramethyl-4-piperidyl)imino]], 4-hydroxy-2,2,6,6-tetramethylpiperidine, 4-methoxy-2,2,6,6-tetramethylpiperidine, 4-ethoxy-2,2,6,6-tetramethylpiperidine, 4-propoxy-2,2,6,6-tetramethylpiperidine, 1-hydroxy-2,2,6,6-tetramethyl-4-hydroxypiperidine, 1-hydroxy-2,2,6,6-tetramethyl-4-methoxypiperidine, 1-hydroxy-2,2,6,6-tetramethyl-4-ethoxypiperidine, 1-hydroxy-2,2,6,6-tetramethyl-4-propoxypiperidine, bis(1-hydroxy-2,2,6,6-tetramethylpiperidin-4-yl) sebacate, 1-oxyl-2,2,6,6-tetramethylpiperidine, 1-oxyl-2,2,6,6-tetramethyl-4-hydroxypiperidine, 1-oxyl-2,2,6,6-tetramethyl-4-hydroxypiperidine acetate, 1-oxyl-2,2,6,6-tetramethyl-4-hydroxypiperidine propanoate, 1-oxyl-2,2,6,6-tetramethyl-4-hydroxypiperidine butyrate, 1-oxyl-2,2,6,6-tetramethyl-4-hydroxypiperidine pentanoate, 1-oxyl-2,2,6,6-tetramethyl-4-hydroxypiperidine hexanoate, 1-oxyl-2,2,6,6-tetramethyl-4-hydroxypiperidine heptanoate, 1-oxyl-2,2,6,6-tetramethyl-4-hydroxypiperidine octanoate, 1-oxyl-2,2,6,6-tetramethyl-4-hydroxypiperidine nonanoate, 1-oxyl-2,2,6,6-tetramethyl-4-hydroxypiperidine decanoate, 1-oxyl-2,2,6,6-tetramethyl-4-hydroxypiperidine undecanoate, 1-oxyl-2,2,6, 6-tetramethyl-4-hydroxypiperidine dodecanoate, bis(1-oxyl-2,2,6,6-tetramethylpiperidin-4-yl) propanedioate, bis (1-oxyl-2,2,6,6-tetramethylpiperidin-4-yl) butanedioate, bis (1-oxyl-2,2,6,6-tetramethylpiperidin-4-yl) pentanedioate, bis(1-oxyl-2,2,6,6-tetramethylpiperidin-4-yl) hexanedioate, bis(1-oxyl-2,2,6,6-tetramethylpiperidin-4-yl) heptanedioate, bis(1-oxyl-2,2,6,6-tetramethylpiperidin-4-yl) octanedioate, bis(1-oxyl-2,2,6,6-tetramethylpiperidin-4-yl) nonanedioate, bis(1-oxyl-2,2,6,6-tetramethylpiperidin-4-yl) sebacate, bis (1-oxyl-2,2,6,6-tetramethylpiperidin-4-yl) dodecandioate, 1-oxyl-2,2,6,6-tetramethyl-4-methoxypiperidine, 1-oxyl-2, 2,6,6-tetramethyl-4-ethoxypiperidine, 1-oxyl-2,2,6,6-tetramethyl-4-propoxypiperidine, and a mixture thereof. Particularly, preferred are bis(1,2,2,6,6-pentamethyl-4-piperidyl) sebacate, and methyl(1,2,2,6,6-pentamethyl-4-piperidyl) sebacate, and (1,2,2,6,6-pentamethyl-4-piperidyl)

sebacate and methyl (1,2,2,6,6-pentamethyl-4-piperidyl) sebacate are more preferably mixed and used.

For stably obtaining the effect, the basic additives are preferably added in an amount of 1 mass % or more of the total amount of the lubricant composition. However, if the basic additives are added excessively, the effect will be saturated and the content of other components will be reduced, which will adversely affect lubricity. Accordingly, the content of the basic additives is 20 mass % or less.

(Other Additives)

To further improve various performances, various additives may be added to the lubricant composition. For example, antioxidants such as phenolic antioxidants and sulfur antioxidants, rust preventives, oil improvers, and metal deactivators may be added alone or in appropriate combination. The addition amount of these additives is not limited to particular one as long as the object of the present invention is not impaired.

There is no restriction in the fluorine-type grease, and sodium nitrite may be added as an additive.

(Rolling Bearing)

The lubricant composition according to the present invention can be used for various applications and is effective in improving fretting resistance. For example, it is effective to apply to a rolling bearing. For a lubrication method for the rolling bearing, the lubricant composition may be supplied to the rolling bearing continuously or intermittently from the outside, or may be used by having it sealed in the rolling bearing. The above lubricant composition provides the rolling bearing according to the present invention with excellent fretting resistance performances.

In addition, an inner ring, an outer ring, and a rolling element of the rolling bearing can be formed of metal such as a bearing steel. Although a ceramic ball is conventionally used as a rolling element as a countermeasure against fretting, the ceramic ball is expensive. Hence, making the rolling element formed of metal provides an inexpensive rolling bearing.

The type of rolling bearing is not limited, and can be applied to a roller bearing with a cage, a full complement ball bearing, a full complement roller bearing, and the like. In addition, the raceway surface may be a single row or a double row.

Particularly, it is suitable for a bearing into which fluorine-type grease penetrates.

EXAMPLE

Hereinafter, the present invention will be further described with reference to Examples and Comparative Examples, but the present invention is not limited thereto.

(Preliminary Test 1)

As shown in Table 1, PAO (48 mm²/s @40° C.) was used as a base oil, a urea compound (a product obtained by allowing cyclohexylamine to react with stearylamine at a ratio of 7 to 3 in diphenylmethane diisocyanate (MDI)) were used as a thickener, and further, a mixture of copper stearate, iron stearate, zinc stearate and magnesium stearate as fatty acid metal salts, ZnDTC as a metal dithiocarbamate and isotridecyl acid phosphate as a phosphorus-type additive were added in an amount indicated in the table to prepare a base grease. Further, amine as a basic additive (a mixture of bis(1,2,2,6,6-pentamethyl-4-piperidyl) sebacate and methyl (1,2,2,6,6-pentamethyl-4-piperidyl) sebacate) were added to the base grease in a range of 0 to 3 mass %, and a test grease was obtained. The amount of the thickener was kept constant at 15 mass %. The balance was defined as the base oil amount and the total amount was set to 100 mass %. In addition, the worked penetration was adjusted to 240. Further, the total acid value of each test grease was measured according to JIS K 2501:2003 (neutralization point pH: 12) and the pH was measured using a commercially available pH meter.

TABLE 1

| | | | No. 1 | No. 2 | No. 3 | No. 4 | No. 5 | No. 6 | No. 7 |
|---|---|---|---|---|---|---|---|---|---|
| Base oil | | Amount of base oil (mass %) | 81.625 | 81.125 | 80.625 | 80.125 | 79.625 | 82.625 | 82.125 |
| | | Kind of base oil | PAO | PAO | PAO | PAO | PAO | PAO | PAO |
| | | Kinematic viscosity (mm²/s @40° C.) | 48 | 48 | 48 | 48 | 48 | 48 | 48 |
| Thickener | | Amount of thickener (mass %) | 15 | 15 | 15 | 15 | 15 | 15 | 15 |
| | | Kind of thickener | Urea | Urea | Urea | Urea | Urea | Urea | Urea |
| Additive | Fatty acid metal salt | Copper stearate (mass %) | 0.015 | 0.015 | 0.015 | 0.015 | 0.015 | 0.015 | 0.015 |
| | | Iron stearate (mass %) | 0.03 | 0.03 | 0.03 | 0.03 | 0.03 | 0.03 | 0.03 |
| | | Zinc stearate (mass %) | 0.03 | 0.03 | 0.03 | 0.03 | 0.03 | 0.03 | 0.03 |
| | | Magnesium stearate (mass %) | 0.1 | 0.1 | 0.1 | 0.1 | 0.1 | 0.1 | 0.1 |
| | Metal dithiocarbamate | ZnDTC (mass %) | 0.2 | 0.2 | 0.2 | 0.2 | 0.2 | 0.2 | 0.2 |
| | Phosphorus-type additive | Isotridecyl acid phosphate (mass %) | 2 | 2 | 2 | 2 | 2 | 2 | 2 |
| | Basic additive | Amine (mass %) | 1 | 1.5 | 2 | 2.5 | 3 | 0 | 0.5 |
| Total acid value (mgKOH/g) | | | 4.1 | 4.0 | 4.2 | 4.4 | 3.5 | 3.7 | 3.7 |
| pH | | | 8.6 | 8.9 | 9.1 | 9.3 | 9.4 | 3.8 | 7.1 |

Note 1:
Urea is a product obtained by allowing cyclohexylamine to react with stearylamine at a ratio of 7 to 3 in MDI.

Note 2:
Amine is a mixture of bis(1,2,2,6,6-pentamethyl-4-piperidyl) sebacate and methyl(1,2,2,6,6-pentamethyl-4-piperidyl) sebacate.

The results are shown in Table 1, and are graphed and shown in FIG. 1. As described above, at the total acid value of 3.7 mg/g or more, metal stearate can be completely dissolved in the base oil, and the fretting resistance is particularly good. As shown in Examples 1 to 7 and Comparative Example 1 described below, the pH is preferably 8.6 or more. With reference to FIG. 1, pH can be increased with the total acid value of the test grease maintained at 3.7 mgKOH/g or more even if the addition amount of the amine is increased. Particularly, when the addition amount of the amine is 1 mass % or more, pH can be increased to 8.6 or more.

(Preliminary Test 2)

As shown in Table 2, PAO (48 mm²/s @40° C.) was used as a base oil, a urea compound (same as that in Preliminary Test 1) was used as a thickener, a mixture of copper stearate, iron stearate, zinc stearate and magnesium stearate, ZnDTC and isotridecyl acid phosphate were added in an amount indicated in the table to prepare a base grease. A fretting test was performed in which 1.0 g of the test grease was sealed in a single-direction thrust ball bearing having an inner diameter of 25 mm, an outer diameter of 52 mm, and a height of 18 mm (brand number: 51305), and an amplitude ratio (=amplitude/contact circle diameter) was set to 2.0. In order to measure the maximum height Ry of a damaged part accurately, the fretting test was performed under the following conditions using a disc specimen obtained by applying a wrapping to a lower race, and using a fretting tester manufactured by Nippon Seiko Co., Ltd. That is, a ball of the thrust ball bearing and an upper race were placed on the disc test piece that is a lower race, and, in a state where the test grease was sealed, the upper race was slightly oscillated with a load from the disc test piece side applied. Further, the maximum height Ry of a damage mark on the disc test piece after the test was measured using an interference microscope, and the degree of damage was evaluated by a damage ratio (=Ry after test/Ry before test). The damage ratio closer to 1 equates with less damage. Further, the total acid value of the test grease was measured according to JIS K 2501: 2003 (neutralization point pH: 12).

<Test Condition>

Maximum surface pressure: 3.2 GPa
Maximum oscillation speed: 20 mm/s
Number of oscillations: 500,0000
Amplitude ratio: 2.0

TABLE 2

|  |  | No. 8 | No. 9 | No. 10 |
|---|---|---|---|---|
| Base oil | Amount of base oil (mass %) | 85.000 | 83.625 | 82.625 |
|  | Kind of base oil | PAO | PAO | PAO |
|  | Kinematic viscosity (mm$^2$/s @40° C.) | 48 | 48 | 48 |
| Thickener | Amount of thickener (mass %) | 15 | 15 | 15 |
|  | Kind of thickener | Urea | Urea | Urea |
| Additive Fatty acid metal salt | Copper stearate (mass %) | — | 0.015 | 0.015 |
|  | Iron stearate (mass %) | — | 0.030 | 0.030 |
|  | Zinc stearate (mass %) | — | 0.030 | 0.030 |
|  | Magnesium stearate (mass %) | — | 0.100 | 0.100 |
| Metal dithiocarbamate | ZnDTC (mass %) | — | 0.200 | 0.200 |
| Phosphorus-type additive | Isotridecyl acid phosphate (mass %) | — | 1 | 2 |
| Total acid value (mgKOH/g) |  | — | 2.0 | 3.7 |
| Damage ratio (500,000) |  | 7.4 | 8.0 | 2.1 |

Note:
Urea is a product obtained by allowing cyclohexylamine to react with stearylamine at a ratio of 7 to 3 in MDI.

Figure 2:
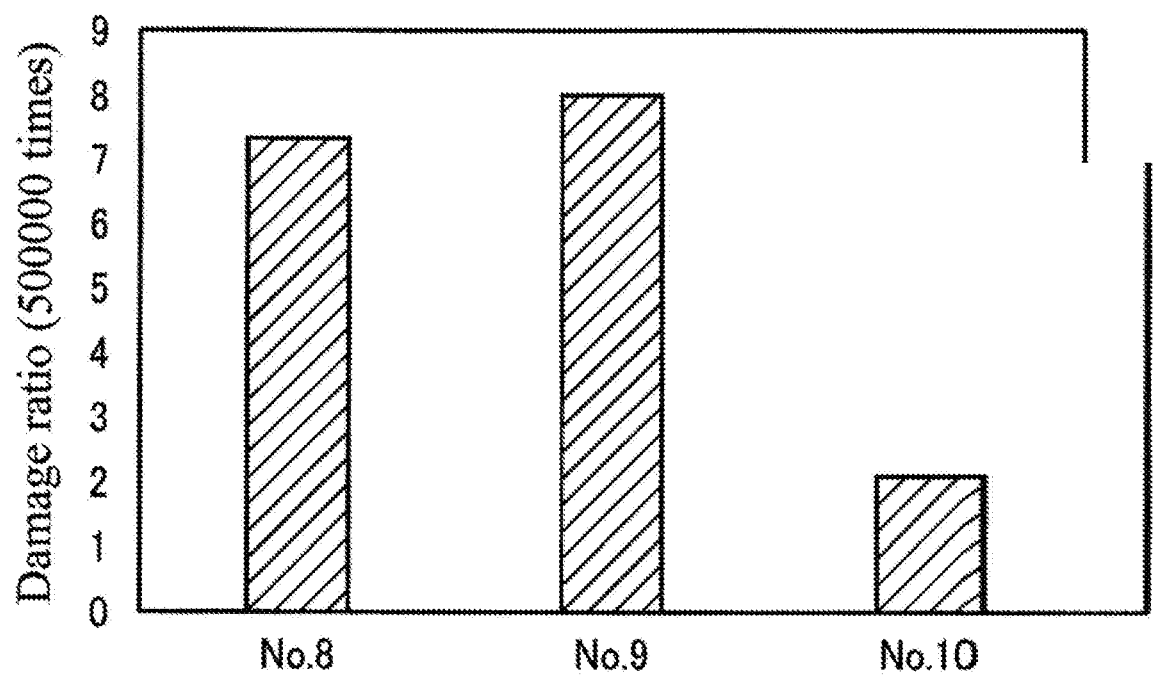
FIG. 2 It is a graph showing damage ratios of Comparative Examples 1 to 3 obtained in Preliminary Test 2.

The results are shown in Table 2, and are graphed and shown in FIG. 2. It can be seen that the test grease, like No. 10, containing three types of additives, fatty acid metal salts, a metal dithiocarbamate and a phosphorus-type additive and having a total acid value of 3.7 mgKOH/g or more provides excellent fretting resistance. In addition, it can be seen that the amount of the phosphorus-type additive should be 2 mass % or more for setting the total acid value to 3.7 mgKOH/g or more. While the fatty acid metal salts of No. 10 having a total acid value of 3.7 mgKOH/g were all dissolved, fatty acid metal salts of No. 9 having a total acid value of 2.0 mgKOH/g were not dissolved completely.

Examples 1 to 7 and Comparative Example 1

Based on the results of Preliminary Test 1 and Preliminary Test 2, base greases were prepared in the composition shown in Table 3. The same types of base oil, thickener, and various additives as those of Preliminary Test 1 and Preliminary Test 2 were used. Further, fluorine-type grease (containing sodium nitrite) was mixed with each of the base greases to prepare test greases. The proportion of the fluorine-type grease in the test grease was fixed at 5 mass % relative to the base grease. The total acid value and pH of the test greases were measured in the same manner as in Preliminary Test 1 and Preliminary Test 2, and further, the damage ratios thereof were measured in the same manner as in Preliminary Test 2 (however, the number of oscillations was 10,000).

TABLE 3

|  |  | Example 1 | Example 2 | Example 3 | Example 4 | Example 5 | Example 6 | Example 7 | Comparative example 1 |
|---|---|---|---|---|---|---|---|---|---|
| Base oil | Amount of base oil (mass %) | 82.125 | 81.625 | 81.125 | 80.625 | 80.125 | 79.625 | 78.625 | 82.625 |
|  | Kind of base oil | PAO | PAO | PAO | PAO | PAO | PAO | PAO | PAO |
|  | Kinematic viscosity (mm$^2$/s @40° C.) | 48 | 48 | 48 | 48 | 48 | 48 | 48 | 48 |

TABLE 3-continued

|  |  |  | Example 1 | Example 2 | Example 3 | Example 4 | Example 5 | Example 6 | Example 7 | Comparative example 1 |
|---|---|---|---|---|---|---|---|---|---|---|
| Thickener |  | Amount of thickener (mass %) | 15 | 15 | 15 | 15 | 15 | 15 | 15 | 15 |
|  |  | Kind of thickener | Urea | Urea | Urea | Urea | Urea | Urea | Urea | Urea |
| Additive | Fatty acid metal salt | Copper stearate (mass %) | 0.015 | 0.015 | 0.015 | 0.015 | 0.015 | 0.015 | 0.015 | 0.015 |
|  |  | Iron stearate (mass %) | 0.030 | 0.030 | 0.030 | 0.030 | 0.030 | 0.030 | 0.030 | 0.030 |
|  |  | Zinc stearate (mass %) | 0.030 | 0.030 | 0.030 | 0.030 | 0.030 | 0.030 | 0.030 | 0.030 |
|  |  | Magnesium stearate (mass %) | 0.100 | 0.100 | 0.100 | 0.100 | 0.100 | 0.100 | 0.100 | 0.100 |
|  | Metal dithiocarbamate | ZnDTC (mass %) | 0.200 | 0.200 | 0.200 | 0.200 | 0.200 | 0.200 | 0.200 | 0.200 |
|  | Phosphorus-type additive | Isotridecyl acid phosphate (mass %) | 2 | 2 | 2 | 2 | 2 | 2 | 2 | 2 |
|  | Basic additive | Amine (mass %) | 0.5 | 1 | 1.5 | 2 | 2.5 | 3 | 4 | 0 |
| Ratio of fluorine-type grease to base grease (mass %) |  |  | 5 | 5 | 5 | 5 | 5 | 5 | 5 | 5 |
| Total acid value (mgKOH/g) |  |  | 3.7 | 4.1 | 4.0 | 4.2 | 4.4 | 3.7 | — | 3.7 |
| pH |  |  | 7.1 | 8.6 | 8.9 | 9.1 | 9.3 | 9.4 | — | 3.8 |
| Damage ratio (10,000) |  |  | 8.6 | 1.5 | — | 2.3 | — | — | 1.0 | 14.3 |

Note 1:
Urea is a product obtained by allowing cyclohexylamine to react with stearylamine at a ratio of 7 to 3 in MDI.

Note 2:
Amine is a mixture of bis(1,2,2,6,6-pentamethyl-4-piperidyl) sebacate and methyl(1,2,2,6,6-pentamethyl-4-piperidyl) sebacate.

Figure 3:
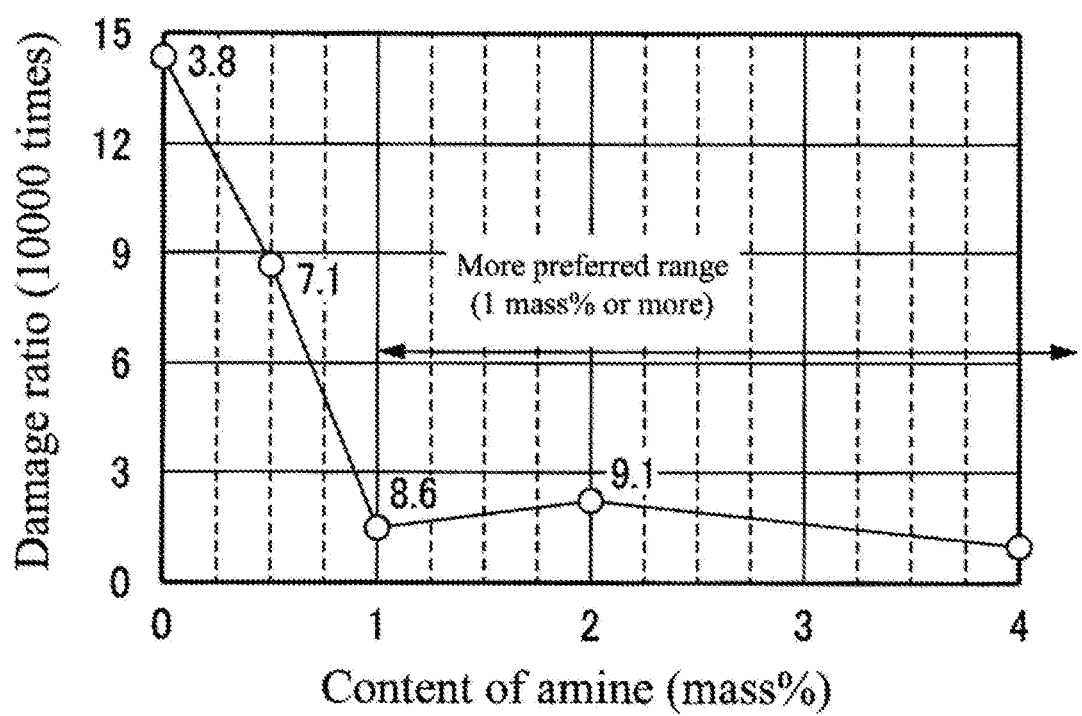
FIG. 3 It is a graph showing a relationship between a content of amine and a damage ratio obtained in Examples.

The results are shown in Table 3, and relationships between the content of the amine and the damage ratio in Examples 1, 2, 4, and 7, and Comparative Example 1 are graphed and shown in FIG. 3. The numerical values near the plot in the figure indicate the pH.

The test grease in Comparative Example 1 is obtained by mixing fluorine-type grease with the test grease of No. 10 in Preliminary Test 2, and the damage ratio is increased. The pH of the test grease in Comparative Example 1 is reduced because isotridecyl acid phosphate that is a phosphorus-type additive contained in the base grease reacts with sodium nitrite of the fluorine-type grease to generate nitric acid. In contrast, the generated nitric acid is neutralized with the amine (basic additive), and this allows the pH to be 7 or more in the test grease of Examples 1 to 7. The damage ratio is also reduced along with it. Particularly, the pH is preferably 8.6 or more, and the addition amount of amine is preferably 1% by mass or more.

Therefore, when the fluorine-type grease is penetrated, the addition of the basic additives can improve the fretting resistance.

Although the invention has been described in detail with reference to specific embodiments, it will be apparent for those skilled in the art that various changes and modifications can be made without departing from the spirit and scope of this disclosure.

This application is based on Japanese Patent Application filed on Dec. 25, 2017 (Japanese Patent Application No. 2017-247912), the contents of which are incorporated herein by reference.

INDUSTRIAL APPLICABILITY

Fretting wear is reduced in a rolling bearing which performs micro reciprocation or undergoes the micro reciprocation, such as a bearing for an AC servo motor, a hub bearing, and a pivot bearing for a hard disk drive (HDD).

The invention claimed is:

1. A urea-type grease composition, comprising:
a fatty acid metal salt;
a metal dithiocarbamate;
a phosphate ester;
a basic additive as an additive; and
a base oil in which a urea compound is blended as a thickener,
wherein a total acid value is 3.7 mgKOH/g to 4.4 mgKOH/g,
wherein a pH is 8.6 to 9.4,
wherein the fatty acid metal salt is a salt formed of a linear or branched fatty acid and metal,
wherein a content of the fatty acid metal salt is 0.1 to 10 mass %,
wherein a content of the metal dithiocarbamate is 0.001 to 0.200 mass %,
wherein a content of the phosphate ester is 2 mass % or higher,
wherein the phosphate ester is one or more selected from alkyl (C12, C14, C16, or C18) acid phosphate, isotridecyl acid phosphate, oleic acid phosphate, tetracosyl acid phosphate, ethylene glycol acid phosphate, 2-hydroxymethyl methacrylate acid phosphate, dibutyl phosphate, bis(2-ethylhexyl) phosphate, diethyl benzyl phosphate, monoethyl phosphate, mono n-butyl phosphate, mono n-octyl phosphate, mono n-lauryl phosphate, and mono (2-hydroxyethyl methacrylate) phosphate,
wherein the base oil is an poly α-olefin having a kinematic viscosity of 10 to 100 mm$^2$/s at a temperature of 40° C.,
wherein the basic additive is one or more hindered amine selected from the group consisting of bis(2,2,6,6-tetramethyl-4-piperidyl) sebacate, bis(1,2,2,6,6-pentamethyl-4-piperidyl) sebacate, tetrakis(1,2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, bis(1-undecanoxy-2,2,6,6-tetramethylpiperidin-4-yl) carbonate, 1,2,2,6,6-pentamethyl-4-piperidyl methacrylate, 2,2,6,6-tetramethyl-4-piperidyl methacrylate, 2,2,6,6-tetramethyl-piperidin-4-yl-hexadecanate, 2,2,6,6-tetramethyl-piperidin-4-yl-octadecanate, methyl(1,2,2,6,6-pentamethyl-4-piperidyl) sebacate, N,N',N'',N'''-tetrakis(4,6-bis(butyl-(N-methyl-2,2,6,6-tetramethylpiperidin-4-yl)amino) triazine-2-yl)-4,7-diazadecane-1,10-diamine, poly(4-hydroxy-2,2,6,6-tetramethyl-1-piperidineethanol-alt-1,4-butanedioic acid), poly[[6-(1,1,3,3-tetramethylbutyl)

amino]-s-triazine-2,4-diyl]-[(2,2,6,6-tetramethyl-4-piperidyl)imino]-hexamethylene-[(2,2,6,6-tetramethyl-4-piperidyl)imino]], 4-hydroxy-2,2,6,6-tetramethylpiperidine, 4-methoxy-2,2,6,6-tetramethylpiperidine, 4-ethoxy-2,2,6,6-tetramethylpiperidine, 4-propoxy-2,2,6,6-tetramethylpiperidine, 1-hydroxy-2,2,6,6-tetramethyl-4-hydroxypiperidine, 1-hydroxy-2,2,6,6-tetramethyl-4-methoxypiperidine, 1-hydroxy-2,2,6,6-tetramethyl-4-ethoxypiperidine, 1-hydroxy-2,2,6,6-tetramethyl-4-propoxypiperidine, bis(1-hydroxy-2,2,6,6-tetramethylpiperidin-4-yl) sebacate, 1-oxyl-2,2,6,6-tetramethylpiperidine, 1-oxyl-2,2,6,6-tetramethyl-4-hydroxypiperidine, 1-oxyl-2,2,6,6-tetramethyl-4-hydroxypiperidine acetate, 1-oxyl-2,2,6,6-tetramethyl-4-hydroxypiperidine propanoate, 1-oxyl-2,2,6,6-tetramethyl-4-hydroxypiperidine butyrate, 1-oxyl-2,2,6,6-tetramethyl-4-hydroxypiperidine pentanoate, 1-oxyl-2,2,6,6-tetramethyl-4-hydroxypiperidine hexanoate, 1-oxyl-2,2,6,6-tetramethyl-4-hydroxypiperidine heptanoate, 1-oxyl-2,2,6,6-tetramethyl-4-hydroxypiperidine octanoate, 1-oxyl-2,2,6,6-tetramethyl-4-hydroxypiperidine nonanoate, 1-oxyl-2,2,6,6-tetramethyl-4-hydroxypiperidine decanoate, 1-oxyl-2,2,6,6-tetramethyl-4-hydroxypiperidine undecanoate, 1-oxyl-2,2,6,6-tetramethyl-4-hydroxypiperidine dodecanoate, bis(1-oxyl-2,2,6,6-tetramethylpiperidin-4-yl) propanedioate, bis(1-oxyl-2,2,6,6-tetramethylpiperidin-4-yl) butanedioate, bis(1-oxyl-2,2,6,6-tetramethylpiperidin-4-yl) pentanedioate, bis(1-oxyl-2,2,6,6-tetramethylpiperidin-4-yl) hexanedioate, bis(1-oxyl-2,2,6,6-tetramethylpiperidin-4-yl) heptanedioate, bis(1-oxyl-2,2,6,6-tetramethylpiperidin-4-yl) octanedioate, bis(1-oxyl-2,2,6,6-tetramethylpiperidin-4-yl) nonanedioate, bis(1-oxyl-2,2,6,6-tetramethylpiperidin-4-yl) sebacate, bis(1-oxyl-2,2,6,6-tetramethylpiperidin-4-yl) dodecandioate, 1-oxyl-2,2,6,6-tetramethyl-4-methoxypiperidine, 1-oxyl-2,2,6,6-tetramethyl-4-ethoxypiperidine, and 1-oxyl-2,2,6,6-tetramethyl-4-propoxypiperidine, and wherein a content of the hindered amine is 1 to 4 mass %.

2. A rolling bearing lubricated by the urea-type grease composition according to claim 1.

3. The urea-type grease composition according to claim 1, wherein the fatty acid metal salt is at least one selected from the group consisting of copper stearate, iron stearate, zinc stearate and magnesium stearate.

4. A urea-type grease composition, comprising:
a fatty acid metal salt;
a metal dithiocarbamate;
a phosphorus-type additive;
a basic additive as an additive; and
a base oil in which a urea compound is blended as a thickener,
wherein the fatty acid metal salt is a mixture of copper stearate, iron stearate, zinc stearate, magnesium stearate,
wherein a total acid value is 3.7 mgKOH/g to 4.4 mgKOH/g,
wherein a pH is 8.6 to 9.4,
wherein a content of the fatty acid metal salt is 0.1 to 10 mass %,
wherein a content of the metal dithiocarbamate is 0.001 to 0.200 mass %,
wherein a content of the phosphorus-type additive is 2 mass % or higher,
wherein the a phosphorus-type additive is one or more selected from alkyl (C12, C14, C16, or C18) acid phosphate, isotridecyl acid phosphate, oleic acid phosphate, tetracosyl acid phosphate, ethylene glycol acid phosphate, 2-hydroxymethyl methacrylate acid phosphate, dibutyl phosphate, bis(2-ethylhexyl) phosphate, diethyl benzyl phosphate, triphenylphosphine, monoethyl phosphate, mono n-butyl phosphate, mono n-octyl phosphate, mono n-lauryl phosphate, and mono (2-hydroxyethyl methacrylate) phosphate,
wherein the base oil is poly α-olefin having a kinematic viscosity of 10 to 100 mm$^2$/s at a temperature of 40° C.,
wherein the basic additive is one or more hindered amine selected from the group consisting of bis(2,2,6,6-tetramethyl-4-piperidyl) sebacate, bis(1,2,2,6,6-pentamethyl-4-piperidyl) sebacate, tetrakis(1,2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, bis(1-undecanoxy-2,2,6,6-tetramethylpiperidin-4-yl) carbonate, 1,2,2,6,6-pentamethyl-4-piperidyl methacrylate, 2,2,6,6-tetramethyl-4-piperidyl methacrylate, 2,2,6,6-tetramethyl-piperidin-4-yl-hexacanate, 2,2,6,6-tetramethyl-piperidin-4-yl-octadecanate, methyl(1,2,2,6,6-pentamethyl-4-piperidyl) sebacate, N,N',N'',N'''-tetrakis(4,6-bis(butyl-(N-methyl-2,2,6,6-tetramethylpiperidin-4-yl)amino) triazine-2-yl)-4,7-diazadecane-1,10-diamine, poly(4-hydroxy-2,2,6,6-tetramethyl-1-piperidineethanol-alt-1,4-butanedioic acid), poly[[6-(1,1,3,3-tetramethylbutyl) amino]-s-triazine-2,4-diyl]-[(2,2,6,6-tetramethyl-4-piperidyl)imino]-hexamethylene-[(2,2,6,6-tetramethyl-4-piperidyl)imino]], 4-hydroxy-2,2,6,6-tetramethylpiperidine, 4-methoxy-2,2,6,6-tetramethylpiperidine, 4-ethoxy-2,2,6,6-tetramethylpiperidine, 4-propoxy-2,2,6,6-tetramethylpiperidine, 1-hydroxy-2,2,6,6-tetramethyl-4-hydroxypiperidine, 1-hydroxy-2,2,6,6-tetramethyl-4-methoxypiperidine, 1-hydroxy-2,2,6,6-tetramethyl-4-ethoxypiperidine, 1-hydroxy-2,2,6,6-tetramethyl-4-propoxypiperidine, bis(1-hydroxy-2,2,6,6-tetramethylpiperidin-4-yl) sebacate, 1-oxyl-2,2,6,6-tetramethylpiperidine, 1-oxyl-2,2,6,6-tetramethyl-4-hydroxypiperidine, 1-oxyl-2,2,6,6-tetramethyl-4-hydroxypiperidine acetate, 1-oxyl-2,2,6,6-tetramethyl-4-hydroxypiperidine propanoate, 1-oxyl-2,2,6,6-tetramethyl-4-hydroxypiperidine butyrate, 1-oxyl-2,2,6,6-tetramethyl-4-hydroxypiperidine pentanoate, 1-oxyl-2,2,6,6-tetramethyl-4-hydroxypiperidine hexanoate, 1-oxyl-2,2,6,6-tetramethyl-4-hydroxypiperidine heptanoate, 1-oxyl-2,2,6,6-tetramethyl-4-hydroxypiperidine octanoate, 1-oxyl-2,2,6,6-tetramethyl-4-hydroxypiperidine nonanoate, 1-oxyl-2,2,6,6-tetramethyl-4-hydroxypiperidine decanoate, 1-oxyl-2,2,6,6-tetramethyl-4-hydroxypiperidine undecanoate, 1-oxyl-2,2,6,6-tetramethyl-4-hydroxypiperidine dodecanoate, bis(1-oxyl-2,2,6,6-tetramethylpiperidin-4-yl) propanedioate, bis(1-oxyl-2,2,6,6-tetramethylpiperidin-4-yl) butanedioate, bis(1-oxyl-2,2,6,6-tetramethylpiperidin-4-yl) pentanedioate, bis(1-oxyl-2,2,6,6-tetramethylpiperidin-4-yl) hexanedioate, bis(1-oxyl-2,2,6,6-tetramethylpiperidin-4-yl) heptanedioate, bis(1-oxyl-2,2,6,6-tetramethylpiperidin-4-yl) octanedioate, bis(1-oxyl-2,2,6,6-tetramethylpiperidin-4-yl) nonanedioate, bis(1-oxyl-2,2,6,6-tetramethylpiperidin-4-yl) sebacate, bis(1-oxyl-2,2,6,6-tetramethylpiperidin-4-yl) dodecandioate, 1-oxyl-2,2,6,6-tetramethyl-4- methoxypiperidine, 1-oxyl-2,2,6,6-tetramethyl-4-ethoxypiperidine, and 1-oxyl-2,2,6,6-tetramethyl-4-propoxypiperidine, and wherein a content of the hindered amine is 1 to 4 mass %.

5. A rolling bearing lubricated by the urea-type grease composition according to claim 4.

6. The lubricant composition according to claim 1, wherein the fatty acid metal salt includes three or more kinds selected from the group consisting of copper stearate, iron stearate, zinc stearate, and magnesium stearate.

7. The lubricant composition according to claim 1, wherein the fatty acid metal salt is a mixture of copper stearate, iron stearate, zinc stearate, and magnesium stearate.

8. The urea-type grease composition according to claim 1, further comprising a phenolic antioxidant or sulfur antioxidant.

9. The urea-type grease composition according to claim 4, further comprising a phenolic antioxidant or sulfur antioxidant.

10. The urea-type grease composition according to claim 1,
wherein the metal dithiocarbamate is a compound represented by the following formula (I):

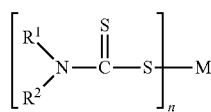

wherein, in Formula (I), M represents Zn; n is an integer corresponding to the valence of the metal; and $R^1$ and $R^2$ independently represent a primary alkyl group, a secondary alkyl group, an aryl group or an alkylaryl group, which have 2 to 18 carbon atoms.

11. The urea-type grease composition according to claim 4,
wherein the metal dithiocarbamate is a compound represented by the following formula (I):

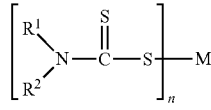

wherein, in Formula (I), M represents Zn; n is an integer corresponding to the valence of the metal; and $R^1$ and $R^2$ independently represent a primary alkyl group, a secondary alkyl group, an aryl group or an alkylaryl group, which have 2 to 18 carbon atoms.

12. The urea-type grease composition according to claim 1,
wherein the hindered amine is one or more selected from the group consisting of bis(1,2,2,6,6-pentamethyl-4-piperidyl) sebacate, and methyl(1,2,2,6,6-pentamethyl-4-piperidyl) sebacate, and (1,2,2,6,6-pentamethyl-4-piperidyl) sebacate, and methyl (1,2,2,6,6-pentamethyl-4-piperidyl) sebacate.

13. The urea-type grease composition according to claim 10,
wherein the hindered amine is one or more selected from the group consisting of bis(1,2,2,6,6-pentamethyl-4-piperidyl) sebacate, and methyl(1,2,2,6,6-pentamethyl-4-piperidyl) sebacate, and (1,2,2,6,6-pentamethyl-4-piperidyl) sebacate, and methyl (1,2,2,6,6-pentamethyl-4-piperidyl) sebacate.

14. The urea-type grease composition according to claim 4,
wherein the hindered amine is one or more selected from the group consisting of bis(1,2,2,6,6-pentamethyl-4-piperidyl) sebacate, and methyl(1,2,2,6,6-pentamethyl-4-piperidyl) sebacate, and (1,2,2,6,6-pentamethyl-4-piperidyl) sebacate, and methyl (1,2,2,6,6-pentamethyl-4-piperidyl) sebacate.

15. The urea-type grease composition according to claim 1,
wherein the hindered amine is two or more selected from the group consisting of bis(2,2,6,6-tetramethyl-4-piperidyl) sebacate, bis(1,2,2,6,6-pentamethyl-4-piperidyl) sebacate, tetrakis(1,2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, bis(1-undecanoxy-2,2,6,6-tetramethylpiperidin-4-yl) carbonate, 1,2,2,6,6-pentamethyl-4-piperidyl methacrylate, 2,2,6,6-tetramethyl-4-piperidyl methacrylate, 2,2,6,6-tetramethyl-piperidin-4-yl-hexadecanate, 2,2,6,6-tetramethyl-piperidin-4-yl-octadecanate, methyl(1,2,2,6,6-pentamethyl-4-piperidyl) sebacate, N,N',N'',N'''-tetrakis(4,6-bis(butyl-(N-methyl-2,2,6,6-tetramethylpiperidin-4-yl)amino)triazine-2-yl)-4,7-diazadecane-1,10-diamine, poly(4-hydroxy-2,2,6,6-tetramethyl-1-piperidineethanol-alt-1,4-butanedioic acid), poly[[6-(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]], 4-hydroxy-2,2,6,6-tetramethylpiperidine, 4-methoxy-2,2,6,6-tetramethylpiperidine, 4-ethoxy-2,2,6,6-tetramethylpiperidine, 4-propoxy-2,2,6,6-tetramethylpiperidine, 1-hydroxy-2,2,6,6-tetramethyl-4-hydroxypiperidine, 1-hydroxy-2,2,6,6-tetramethyl-4-methoxypiperidine, 1-hydroxy-2,2,6,6-tetramethyl-4-ethoxypiperidine, 1-hydroxy-2,2,6,6-tetramethyl-4-propoxypiperidine, bis(1-hydroxy-2,2,6,6-tetramethylpiperidin-4-yl) sebacate, 1-oxyl-2,2,6,6-tetramethylpiperidine, 1-oxyl-2,2,6,6-tetramethyl-4-hydroxypiperidine, 1-oxyl-2,2,6,6-tetramethyl-4-hydroxypiperidine acetate, 1-oxyl-2,2,6,6-tetramethyl-4-hydroxypiperidine propanoate, 1-oxyl-2,2,6,6-tetramethyl-4-hydroxypiperidine butyrate, 1-oxyl-2,2,6,6-tetramethyl-4-hydroxypiperidine pentanoate, 1-oxyl-2,2,6,6-tetramethyl-4-hydroxypiperidine hexanoate, 1-oxyl-2,2,6,6-tetramethyl-4-hydroxypiperidine heptanoate, 1-oxyl-2,2,6,6-tetramethyl-4-hydroxypiperidine octanoate, 1-oxyl-2,2,6,6-tetramethyl-4-hydroxypiperidine nonanoate, 1-oxyl-2,2,6,6-tetramethyl-4-hydroxypiperidine decanoate, 1-oxyl-2,2,6,6-tetramethyl-4-hydroxypiperidine undecanoate, 1-oxyl-2,2,6,6-tetramethyl-4-hydroxypiperidine dodecanoate, bis(1-oxyl-2,2,6,6-tetramethylpiperidin-4-yl) propanedioate, bis(1-oxyl-2,2,6,6-tetramethylpiperidin-4-yl) butanedioate, bis(1-oxyl-2,2,6,6-tetramethylpiperidin-4-yl) pentanedioate, bis(1-oxyl-2,2,6,6-tetramethylpiperidin-4-yl) hexanedioate, bis(1-oxyl-2,2,6,6-tetramethylpiperidin-4-yl) heptanedioate, bis(1-oxyl-2,2,6,6-tetramethylpiperidin-4-yl) octanedioate, bis(1-oxyl-2,2,6,6-tetramethylpiperidin-4-yl) nonanedioate, bis(1-oxyl-2,2,6,6-tetramethylpiperidin-4-yl)

sebacate, bis(1-oxyl-2,2,6,6-tetramethylpiperidin-4-yl) dodecandioate, 1-oxyl-2,2,6,6-tetramethyl-4-methoxypiperidine, 1-oxyl-2,2,6,6-tetramethyl-4-ethoxypiperidine, and 1-oxyl-2,2,6,6-tetramethyl-4-propoxypiperidine.

16. The urea-type grease composition according to claim 4,
wherein the hindered amine is two or more selected from the group consisting of bis(2,2,6,6-tetramethyl-4-piperidyl) sebacate, bis(1,2,2,6,6-pentamethyl-4-piperidyl) sebacate, tetrakis(1,2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, bis(1-undecanoxy-2,2,6,6-tetramethylpiperidin-4-yl) carbonate, 1,2,2,6,6-pentamethyl-4-piperidyl methacrylate, 2,2,6,6-tetramethyl-4-piperidyl methacrylate, 2,2,6,6-tetramethyl-piperidin-4-yl-hexadecanate, 2,2,6,6-tetramethyl-piperidin-4-yl-octadecanate, methyl(1,2,2,6,6-pentamethyl-4-piperidyl) sebacate, N,N',N",N'"-tetrakis(4,6-bis(butyl-(N-methyl-2,2,6,6-tetramethylpiperidin-4-yl)amino)triazine-2-yl)-4,7-diazadecane-1,10-diamine, poly(4-hydroxy-2,2,6,6-tetramethyl-1-piperidineethanol-alt-1,4-butanedioic acid), poly[[6-(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]], 4-hydroxy-2,2,6,6-tetramethylpiperidine, 4-methoxy-2,2,6,6-tetramethylpiperidine, 4-ethoxy-2,2,6,6-tetramethylpiperidine, 4-propoxy-2,2,6,6-tetramethylpiperidine, 1-hydroxy-2,2,6,6-tetramethyl-4-hydroxypiperidine, 1-hydroxy-2,2,6,6-tetramethyl-4-methoxypiperidine, 1-hydroxy-2,2,6,6-tetramethyl-4-ethoxypiperidine, 1-hydroxy-2,2,6,6-tetramethyl-4-propoxypiperidine, bis(1-hydroxy-2,2,6,6-tetramethylpiperidin-4-yl) sebacate, 1-oxyl-2,2,6,6-tetramethylpiperidine, 1-oxyl-2,2,6,6-tetramethyl-4-hydroxypiperidine, 1-oxyl-2,2,6,6-tetramethyl-4-hydroxypiperidine acetate, 1-oxyl-2,2,6,6-tetramethyl-4-hydroxypiperidine propanoate, 1-oxyl-2,2,6,6-tetramethyl-4-hydroxypiperidine butyrate, 1-oxyl-2,2,6,6-tetramethyl-4-hydroxypiperidine pentanoate, 1-oxyl-2,2,6,6-tetramethyl-4-hydroxypiperidine hexanoate, 1-oxyl-2,2,6,6-tetramethyl-4-hydroxypiperidine heptanoate, 1-oxyl-2,2,6,6-tetramethyl-4-hydroxypiperidine octanoate, 1-oxyl-2,2,6,6-tetramethyl-4-hydroxypiperidine nonanoate, 1-oxyl-2,2,6,6-tetramethyl-4-hydroxypiperidine decanoate, 1-oxyl-2,2,6,6-tetramethyl-4-hydroxypiperidine undecanoate, 1-oxyl-2,2,6,6-tetramethyl-4-hydroxypiperidine dodecanoate, bis(1-oxyl-2,2,6,6-tetramethylpiperidin-4-yl) propanedioate, bis(1-oxyl-2,2,6,6-tetramethylpiperidin-4-yl) butanedioate, bis(1-oxyl-2,2,6,6-tetramethylpiperidin-4-yl) pentanedioate, bis(1-oxyl-2,2,6,6-tetramethylpiperidin-4-yl) hexanedioate, bis(1-oxyl-2,2,6,6-tetramethylpiperidin-4-yl) heptanedioate, bis(1-oxyl-2,2,6,6-tetramethylpiperidin-4-yl) octanedioate, bis(1-oxyl-2,2,6,6-tetramethylpiperidin-4-yl) nonanedioate, bis(1-oxyl-2,2,6,6-tetramethylpiperidin-4-yl) sebacate, bis(1-oxyl-2,2,6,6-tetramethylpiperidin-4-yl) dodecandioate, 1-oxyl-2,2,6,6-tetramethyl-4-methoxypiperidine, 1-oxyl-2,2,6,6-tetramethyl-4-ethoxypiperidine, and 1-oxyl-2,2,6,6-tetramethyl-4-propoxypiperidine.

17. The urea-type grease composition according to claim 1,
wherein the hindered amine is two or more selected from the group consisting of bis(1,2,2,6,6-pentamethyl-4-piperidyl) sebacate, and methyl(1,2,2,6,6-pentamethyl-4-piperidyl) sebacate, and (1,2,2,6,6-pentamethyl-4-piperidyl) sebacate, and methyl (1,2,2,6,6-pentamethyl-4-piperidyl) sebacate.

18. The urea-type grease composition according to claim 4,
wherein the hindered amine is two or more selected from the group consisting of bis(1,2,2,6,6-pentamethyl-4-piperidyl) sebacate, and methyl(1,2,2,6,6-pentamethyl-4-piperidyl) sebacate, and (1,2,2,6,6-pentamethyl-4-piperidyl) sebacate, and methyl (1,2,2,6,6-pentamethyl-4-piperidyl) sebacate.

* * * * *